March 16, 1965 D. B. HORNER 3,173,417
SELF-POWERED STERILIZABLE SURGICAL DRILL
Filed June 15, 1961 2 Sheets-Sheet 1
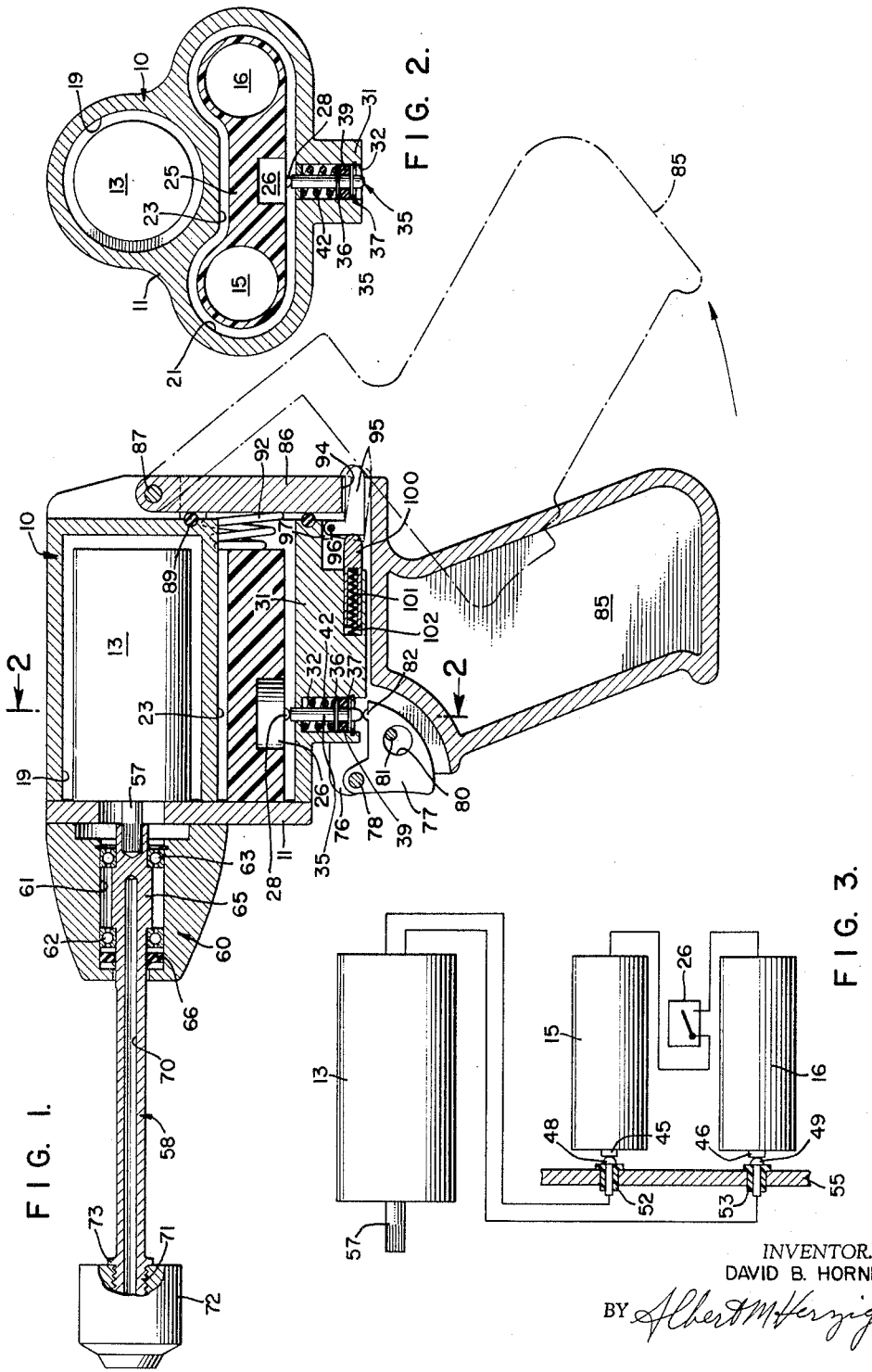
INVENTOR.
DAVID B. HORNER
BY *Albert M Herzig*
ATTORNEY March 16, 1965  D. B. HORNER  3,173,417
SELF-POWERED STERILIZABLE SURGICAL DRILL
Filed June 15, 1961  2 Sheets-Sheet 2
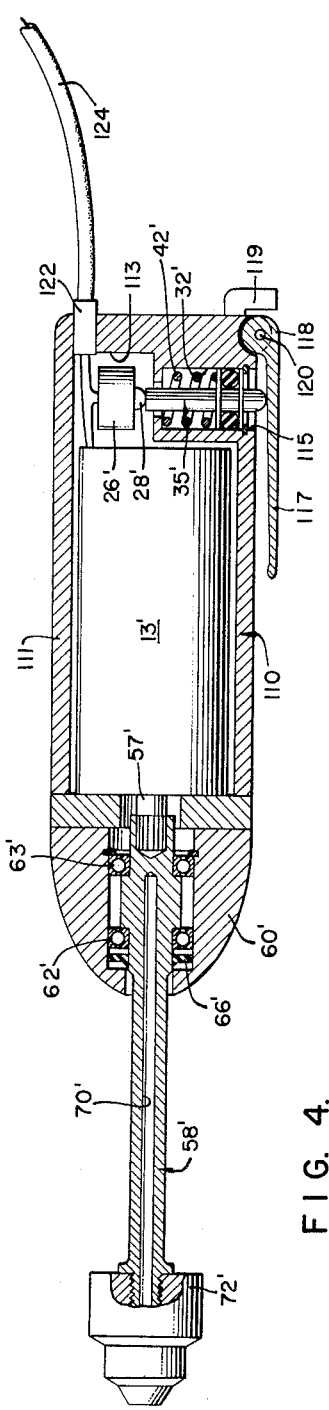
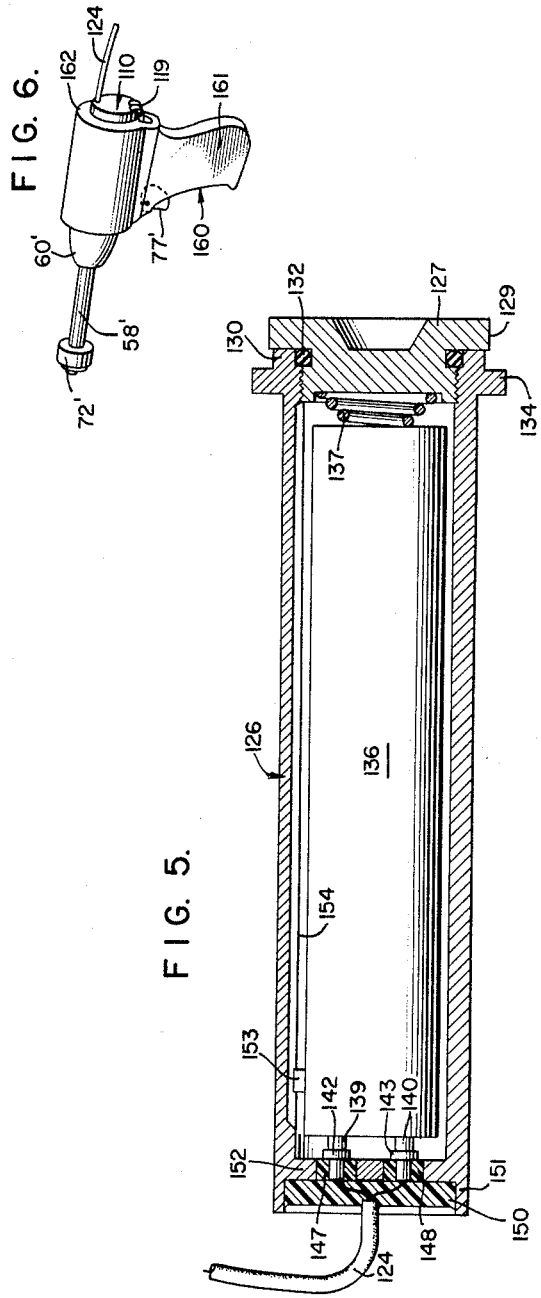
INVENTOR.
DAVID B. HORNER
BY *Albert M Herzig*
ATTORNEY United States Patent Office 3,173,417
Patented Mar. 16, 1965

3,173,417
SELF-POWERED STERILIZABLE SURGICAL DRILL
David B. Horner, 233 N. Prairie Ave., Inglewood, Calif.
Filed June 15, 1961, Ser. No. 117,448
2 Claims. (Cl. 128—305)

This invention relates to an improved, self-powered surgical tool or instrument which is exemplified herein as a self-contained battery powered surgical drill. The frame or housing of the unit is provided with seals so that it is pressure tight and water tight and can be sterilized by being put into a sterilizing solution or in an autoclave. The herein invention is a continuation-in-part of my previously filed application, Serial No. 90,400, filed February 20, 1961, now Patent No. 3,120,845. The sealed construction provides resistance to high temperatures and high ambient pressures and embodies means to render the same explosion proof and fire-proof in the presence of anesthetic gases. Preferably, the instrument is portable, driven by an electric motor powered from batteries. It has been found that if the batteries are incorporated in the instrument and exposed to high temperatures and comparable conditions in sterilizing the unit, the life of the batteries is substantially shortened or destroyed. This invention accordingly provides means whereby the batteries may be spaced from the instrument itself while it is being sterilized so that they are not subjected to the sterilizing solution or the temperature in the auto-clave.

The primary object of the invention is to provide the means in an instrument, as described, whereby the batteries need not be subjected to the temperature of sterilization. This may be achieved in various ways as described hereinafter. In a preferred form of the invention, the batteries are mounted in a cartridge which is separable from the instrument so that the cartridge can be removed when sterilizing the instrument. The construction of the instrument is such that it can be conveniently held in sterile condition by a doctor or other person who is also sterile, the cartridge being then slipped into the instrument which is closed and sealed and maintained sterile. In another form of the invention, the batteries are contained in a separate container or cartridge connected to the instrument itself by wires. In both cases, the batteries are inserted *after the housing* is sterilized. Even though the battery case is separate from the drill, it must be sterilized with it. The objects of the invention include the attainment of these results and the implementation of the concept by provision of the particular preferred forms of the invention referred to.

The further object to protect the batteries against being energized inadvertently and to prevent possible short circuiting of the battery connections by sterilizing solution by embodying the control switch for the driving motor in the removable cartridge. Preferably, this assembly is an integral unitary article which can be placed in the instrument with the operating switch then coming in juxtaposition with the manual actuating member which is preferably similar to a trigger positioned adjacent the pistol grip of the instrument.

Further objects and additional advantages will become apparent from the following detailed description, claims and annexed drawings wherein:

FIG. 1 is a sectional view of a preferred form of the invention;

FIG. 2 is a sectional view taken along the line 2—2 of FIG. 1;

FIG. 3 is a diagrammatic view illustrating the manner in which the electrical connections are made within the housing of the instrument;

FIG. 4 is a sectional view of a modified form of the invention;

FIG. 5 is a sectional view of the battery unit used with the form of the invention shown in FIG. 4;

FIG. 6 is a perspective view of a separable pistol grip handle associated with the unit of FIG. 4.

Referring now more in detail to FIGS. 1, 2 and 3 of the drawings, FIG. 1 shows an instrument of the type described comprising a housing as indicated at 10 which has a cross-sectional shape as shown in FIG. 2. The instrument may be constructed of any suitable materials such as plastic or other material. Numeral 11 designates the housing part of the instrument which encloses a driving motor 13 which is an electrical motor and the batteries. The batteries are designated at 15 and 16 which may be of the rechargeable nickel-cadmium types or other high energy rechargeable batteries. The housing 11 in the form of the invention shown has a bore 19 in the upper part thereof in which the motor 13 is mounted. Below the bore 19 in the housing 11, it has an opening or space designated by the numeral 21 which comprises two generally cylindrical bores as shown connected by a flat sided space as designated at 23. This opening is shaped to receive a removable cartridge designated by the numeral 25. This cartridge is shaped to fit the space and comprises the batteries 15 and 16 and a micro switch 26 potted in plastic. The micro switch has an operating button 28 which protrudes beyond the surface of the cartridge 25. The shape of the opening 21 and the cartridge 25 is such that the cartridge can be inserted in only one position, that is, in only one way. The housing 11 has a downwardly extending part 31 which has a bore 32. In this bore, there is provided an actuating stem 35 having on it collars 36 and 37. Between these collars is a sealing O-ring 39 which seals the interior of the housing 11 at that point. The stem 35 is biased outwardly by a coil spring 42 pressing against collar 36. When the cartridge 25 is in position in the housing, the button 28 is adjacent to or juxtaposed against the end of the stem 35 as may be seen in FIG. 1.

FIG. 3 illustrates diagrammatically how the terminals of the battery may be connected to the motor in the housing 11. The connections between the switch 26 and the batteries 15 and 16 may be potted in the cartridge 25. The terminals 45 and 46 of the batteries protrude beyond the end of the cartridge and abut against contacts or terminals 48 and 49 suitably positioned within the housing 11. Contacts 48 and 49 are insulated by insulating sleeves 52 and 53. The contacts 48 and 49 may be mounted in an end wall of the housing 11 or they may be mounted on a separate insulative panel as illustrated by the numeral 55 in FIG. 3 positioned inside of the housing 11.

The motor 13 can be made removable from the housing 11 if desired but this is not necessary for accomplishment for the primary purposes of this invention.

The motor has a shaft 57, the end of which is splined and which is received in the end of a driving stem or shaft 58. The housing 11 has a tapering boss or bushing 60 having a bore 61 in which are provided bearings 62 and 63 and the stem 58 is journalled in these bearings, the stem having a part 65 between them of slightly larger diameter. The bore 61 is fully sealed by a sealing member 66 in the bore and through which the stem 58 extends, there being an opening in the end of the boss or bushing 60. The stem 58, as shown, has an internal bore 70. It has a threaded nipple 71 on its end and attached on this nipple is a conventional chuck 72 for holding tools such as drill bits or the like. The stem 58 has a flange 73 which is adjacent to the end surface of the chuck 72.

The lower part of the housing 11 has a forward bifurcated part as designated at 76. In the slot provided between the bifurcations there is provided a trigger or actuating member 77 pivoted on a stem 78 extending between the bifurcations. The trigger has a hole in it as designated at 80 and within the hole is a transverse pin 81 of smaller diameter which serves to limit the amount of angular movement of the trigger member. The trigger member has the shape shown and it has an extending abutment 82 engageable with the end of the actuating stem 35 for purposes of actuating the switch 26 when the cartridge 25 is in the housing 11.

The instrument is provided with a pistol grip type of handle which is designated generally at 85. It may be made of the same materials and may be of a hollow construction for lightness. The handle includes an upper part as designated at 86 which forms the back closure of the housing 11 and which is pivoted to the housing on a pivot pin or stem 87. The part 86 seals the opening in the housing 11 by way of a sealing member 89 extending continuously around the opening 21 for the cartridge 25. Carried on the inside of the part 86 are coil springs 92 which come into engagement with the batteries for holding them in position. The electrical connections may be through these springs if desired.

The part 86 has an opening in it as designated at 94 to receive a pivoted latching finger 95 pivoted on a pin 96 extending through a lug 97 on the lower part of housing 11 rearwardly of the downwardly extending part 31. The latch 95 secures the handle 85 and part 86 in closed position by engaging with the part 86 as shown, the latch 95 being hooked shaped. Numeral 100 designates a biasing plunger disposed in a bore 101 in the part 31 having a spring 102 in it which normally urges the plunger 100 outwardly against the end of latch finger 95 urging it into latching position. The finger 95 may be manually unlatched for opening the instrument by rotating the pistol grip handle 85 in the direction of the dotted line position as shown.

From the foregoing, the operation and utilization of the invention will be readily apparent to those skilled in the art. With the cartridge 25 in the instrument, the motor 13 may be energized by merely pulling the trigger 77 which actuates the stem 35 and the micro switch 26.

The instrument may be opened, as described, by releasing the latch 95 and rotating the handle 85 on its pivot 87. The cartridge 25 may be removed and the instrument without the cartridge may be sterilized in an autoclave which may contain steam at high temperatures and pressure. There are two methods of sterilizing, i.e. by steam in an auto-clave, or by cold solution of one of many germicidal agents. Thus, while being sterilized, the cartridge 25 with the batteries and switch 26 is not subjected to the sterilizing solution temperature. Thus, the life of the batteries is not diminished by having to expose them to this temperature. The instrument may be held by a doctor, for example, by the handle 85 after being sterilized while the cartridge 25 is slipped into the instrument by another person. The housing 11 is then closed so that the instrument is sealed while remaining fully sterile.

The fact that the switch 26 is potted in plastic in the cartridge 25 removes it from the vicinity of the trigger 77 and also the motor 13 while it is out of the housing 11. There is no possibility of shorting the batteries or establishing a complete circuit in any way so that the device is completely safe and explosion proof. The batteries cannot be connected in a circuit unless they are in the housing 11. The switch contacts cannot be shorted by a solution because they are remote from the instrument when it is being sterilized.

FIGS. 4 and 5 show a modified form of the invention in which the batteries are not mounted in the instrument itself. In FIG. 4, those parts which are the same or correspond to similar parts in FIG. 1, are numbered the same primed. The instrument as designated generally at 110 in FIG. 4 comprises a cylindrical housing 111, having a similar tapering boss or bushing 60' from which extends the rotatable driving stem 58' having chuck 72' at its end.

The micro switch 26' is mounted in an opening 113 at the rear end of the housing 111. The operating stem 35' is disposed in a bore 32' in this part of the housing so that the inner end of the stem is adjacent the actuating button 28' of the micro switch 26'. The stem 35' is sealed as it is in the previous embodiment. The end of the stem extends out of the housing 111 through a bore or opening 115 of smaller diameter. Adjacent to the end of the stem 35' is an actuating handle 117 having a part 118 pivoted on a pivot pin 120 extending through parts of the base of the housing 111. The lever 117 extends inwardly from the base or rear end of the housing so that when the instrument is held in the operator's hand it is convenient to operate the lever 117 with the palm of the hand which actuates the stem 35' and micro switch 26'. A stop 119 is provided at the rear of instrument 110 to prevent it from flopping away from stem 35'.

The leads to the micro switch 26' and battery 13 extend through a sealed insulating fitting 122 in the base of the housing 111. The leads are designated at 124 and they connect to a separate container or cartridge 126 as shown in FIG. 5. As in the previous embodiment, the housings or containers may be made of suitable materials such as plastic. The container or housing 126 is cylindrical having a screw threaded end cap as shown at 127 having a flange 129 engaging with an annular end part 130 of the container 126. The cap 127 has an annular groove underneath the head or flange 129 and adjacent this groove is a complementary groove inside of the extending flange part 130 of the housing 126 and received in the opening formed is a sealing O-ring 132. The housing 126 has an extending flange 134 adjacent its end. As shown, the single battery as designated at 136 is provided in the housing 126 although more than one battery could be used. The cap 127 has a coil spring on its inner side as designated at 137 which bears against the end of the battery 136. The battery terminals 139 and 140 bear against contactors or terminals 142 and 143 within the container 126, these terminals being insulated by insulating sleeves 147 and 148. The leads 124 may be potted in a plastic end cap 150 disposed within an end flange 151 on the end of the housing 126 and adjacent the end plate 151 which carries the contactors 142 and 143. The battery 136 is replaced by removing the end cap 127 and inserting a battery. Preferably, the battery is provided with a key attachable to the side thereof as shown at 153 engageable in an elongated slot in an elongated member 154 provided in the housing 126 so that the battery can be inserted in only one position in which the terminals come into engagement to complete a circuit.

In this embodiment of the invention, the instrument as shown in FIG. 4 as well as the container 126 are sterilized in the manner described in connection with the previous embodiment without the necessity of exposing the battery to the sterilizing solution or auto-clave temperature. The wire leads 124 may be five or six feet long for example. Thus, this result may be realized safely without any danger of malfunction, explosion or lack of sterility.

FIG. 6 shows a further modified form of the invention in which a piston grip type handle as designated at 160 is provided for the instrument of FIG. 4. This handle is simply a pistol grip configuration as designated at 161 with an integral upper cylindrical part 162 having a bore of a size to receive the cylindrical body 110 of the instrument of FIG. 4 and a slot to receive lever 117. The pistol grip handle is provided with a trigger 77' corresponding to that of FIG. 1. The instrument 110 is inserted into the handle 160 in a position such that the operating lever 117 comes into juxtaposition to the trigger 77' so that the switch is actuatable by the trigger. The handle part 160 may be made of any suitable material such as lightweight plastic or aluminum. The handle part 160 is made so that the body 110 has a snug fit therein.

With reference to the embodiment of FIGS. 1 to 3, the cartridge 25 can, of course, be made so that the batteries are removable therefrom for replacement. In the embodiment of FIG. 4, the stem 35' may be held in its bore by means of a snap ring at the extremity of the bore, this type of construction being one that would facilitate manufacture and fabrication.

From the foregoing, those skilled in the art will observe that the invention achieves the objectives and advantages outlined in the foregoing, as well as other advantages that are apparent from the detailed description. The device insures the desired degree of sterile qualities and safety yet eliminates the drawback of shortening battery life or destroying them by exposing them to high temperatures. The overall instrument can be very light and of course, portable and is of such construction as to be foolproof as well as being relatively easy and economical to manufacture.

The foregoing disclosure is representative of preferred forms of the invention and is to be interpreted in an illustrative rather than a limiting sense, the invention to be accorded the full scope of the claims appended hereto.

What is claimed is:

1. In a surgical device comprising an apparatus adapted for rotatably driving a tool, said apparatus comprising a housing, means comprising a motor within the housing for driving the tool, switch actuating means for controlling the operation of the motor and means for sealing the housing whereby the entire apparatus may be sterilized in a liquid solution, the improvement comprising a power pack for powering said motor comprising:
   (a) battery means;
   (b) electrical circuit means connecting said battery means in an external circuit;
   (c) a unitary cartridge for said battery means; said cartridge isolating at least a portion of said battery means and at least a portion of said circuit means from said liquid solution during said sterilizing operation; and
   (d) holder means for said apparatus including means providing a pistol grip, said holder means being moveable to and from a position in juxtaposition to said switch actuating means, said holder means having a trigger for engaging said actuating means when said holder means is juxtaposed to said switch actuating means.

2. A power driven surgical apparatus having means for rotating a tool, said apparatus comprising:
   (a) a housing having an irregularly-shaped encompassing sidewall defining a chamber therein;
   (b) means removably fitting within said chamber comprising a unitary cartridge arranged to be removably inserted within said chamber, said unitary cartridge having an irregularly-shaped, encompassing sidewall which is approximately complementary to said chamber, whereby said cartridge can only be placed in said chamber in one predetermined position, said cartridge including battery means for powering said rotating means, said cartridge also including a switch for controlling said batteries and a circuit electrically connecting said switch to said batteries;
   (c) a closure member hinged to said housing, said closure member including a part forming a pistol grip handle for said apparatus, said closure member completely sealing said apparatus when closed to prevent access of sterilizing solution to the interior of said apparatus;
   (d) spring means positionable by said closure member to engage said cartridge, said spring means being compressed by said closure member when closed to firmly seat said cartridge in position in said chamber;
   (e) actuator means forming part of said apparatus, said actuator means having a part juxtaposed relative to said switch within said housing when said cartridge is in position in said chamber, whereby said switch may be actuated from the exterior of said housing; and
   (f) means for sealing said actuating means.

References Cited by the Examiner

UNITED STATES PATENTS

| 873,123 | 4/07 | Gardy | 310—50 X |
|---|---|---|---|
| 2,261,230 | 11/41 | Cox et al. | 128—317 |
| 2,829,285 | 4/58 | Steiner et al. | 310—50 |
| 2,936,386 | 5/60 | Cohn | 310—50 |
| 2,963,598 | 12/60 | Kent | 310—50 |

FOREIGN PATENTS 1,078,958  3/60  Germany.

RICHARD A. GAUDET, *Primary Examiner.*
JORDAN FRANKLIN, *Examiner.*